(12) United States Patent
Matousek et al.

(10) Patent No.: US 6,388,830 B1
(45) Date of Patent: May 14, 2002

(54) HEAD SWITCHING OPERATION UTILIZING AN AUTOMATIC DUMMY LOAD

(75) Inventors: Robert Matousek, Oklahoma City; Timothy T. Walker, Edmond, both of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/365,050

(22) Filed: Jul. 30, 1999

Related U.S. Application Data
(60) Provisional application No. 60/094,882, filed on Jul. 31, 1998.

(51) Int. Cl.[7] .............................. G11B 15/12; G11B 5/02
(52) U.S. Cl. ............................. 360/63; 360/61; 360/66
(58) Field of Search ........................ 360/46, 66, 61, 360/63, 64, 67

(56) References Cited

U.S. PATENT DOCUMENTS

| | | |
|---|---|---|
| 4,712,144 A | 12/1987 | Klaassen |
| 4,903,151 A | 2/1990 | Mizukami et al. |
| 5,262,907 A | 11/1993 | Duffy et al. |
| 5,373,402 A | 12/1994 | Price, Jr. et al. |
| 5,995,311 A | * 11/1999 | Kuwano ...................... 360/61 |
| 6,141,165 A | * 10/2000 | Nguyen et al. ............... 360/63 |

OTHER PUBLICATIONS

Buhler, "Read Head Switching", Feb. 1985, IBM Technical Disclosure Bulletin, pp. 5423–5424.*

Philips TDA5361 "Pre–amplifier for Hard Disk Drive with MR read / Inductive write heads."

* cited by examiner

*Primary Examiner*—Regina Y. Neal
(74) *Attorney, Agent, or Firm*—Crowe & Dunlevy

(57) ABSTRACT

Apparatus and method for a head switching operation utilizing an automatic dummy load in a disc drive. A preamplifier circuit sequentially selects head positions and applies corresponding bias currents. A sequence control circuit automatically diverts the path of a first bias current from a head selection circuit to a dummy load after detecting an input of a second head location value into a buffer, and before the input is complete. After a bias current value for the second head is written into the buffer, the sequence control automatically deasserts the path to the dummy load after a predetermined time interval. The second bias current is then applied to the second head.

7 Claims, 4 Drawing Sheets

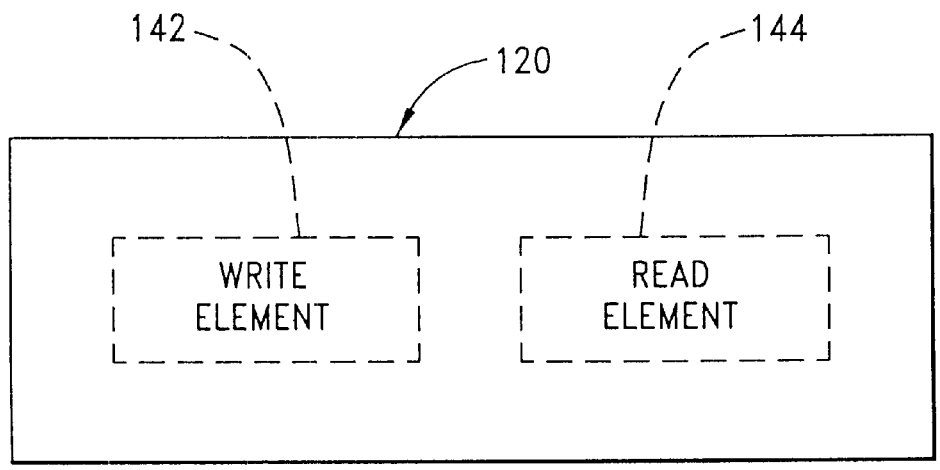
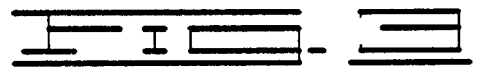
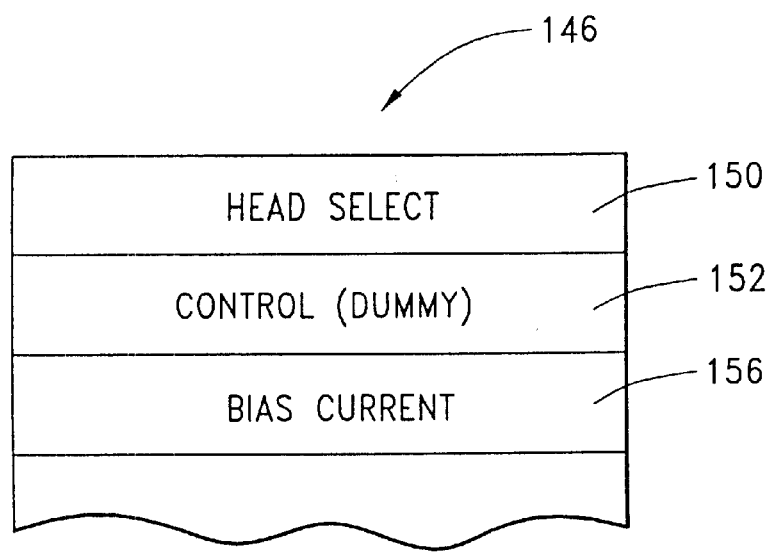
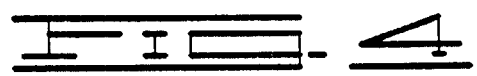

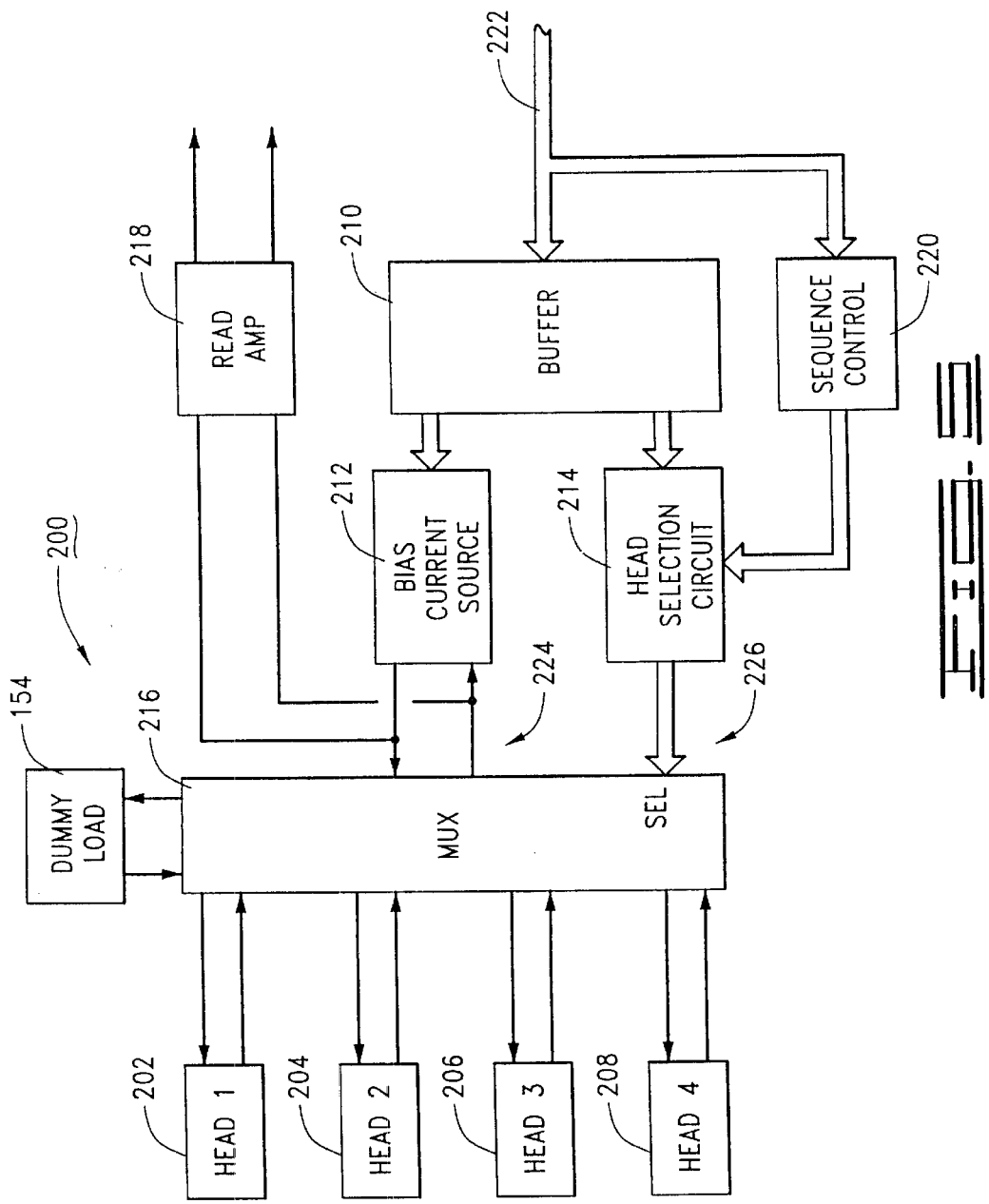

HEAD SWITCHING OPERATION UTILIZING AN AUTOMATIC DUMMY LOAD

RELATED APPLICATIONS

This application claims the benefit of U.S. Provisional Application No. 60/094,882, filed Jul. 31, 1998.

FIELD OF THE INVENTION

This invention relates generally to the field of disc drive storage devices, and more particularly, but not by way of limitation, to improving data transfer operations by utilizing an automatic dummy load during a head switching operation.

BACKGROUND OF THE INVENTION

Hard disc drives are used in modem computer systems to enable users to store and retrieve vast amounts of data in a fast and efficient manner. A typical disc drive is generally composed of a head/disc assembly (HDA) which houses requisite mechanical portions of the drive and a printed wiring assembly (PWA) which supports requisite electronic portions of the drive.

The HDA includes a base deck to which various components are mounted and a top cover which cooperates with the base deck to form a sealed housing to reduce particulate contamination. Within the housing, a disc stack is formed from one or more magnetic recording discs which are axially aligned for rotation by a spindle motor at a constant, high speed, such as 10,000 revolutions per minute during normal disc drive operation.

A rotary actuator assembly is mounted adjacent the disc stack and includes a plurality of rigid arms which extend into the stack between adjacent discs, as well as above and below the top and bottom discs. The rigid arms support flexible suspension assemblies, which in turn support a corresponding number of read/write heads adjacent the surfaces of the discs. One head is provided for each disc surface to read data from and to write data to the corresponding surface.

Of particular interest are magneto-resistive (MR) heads, which utilize thin-film inductive write elements to write data and MR read elements to read previously written data. A typical MR read element is formed from an alloy of materials so as to have a baseline electrical resistance which varies in the presence of a magnetic field of a selected orientation. By passing a bias current (this bias current may be generated by a means of current, voltage or power biasing method) through the MR element, the selective magnetization of a corresponding track can be determined in relation to variations in voltage detected across the MR element.

A preamplifier/driver circuit is typically mounted to the side of the actuator assembly and includes a write driver circuit to apply write currents to a selected write element during a write operation. The preamplifier/driver circuit further includes a read bias current source which is sequentially connected to the appropriate read element to effect a read operation.

The electronics provided on the disc drive PWA primarily serve to control the operation of the HDA and to communicate with a host computer in which the disc drive is mounted. Generally, the top level functional blocks on the PWA include a read/write channel which controls the reading and writing of data from and to the discs, a spindle motor control circuit which controls the rotation of the spindle motor, and a servo control circuit which controls the position of the heads.

Aspects of a typical servo control circuit are discussed in U.S. Pat. No. 5,262,907 issued to Duffy et al., assigned to the assignee of the present invention. The servo control circuit positions the heads relative to the tracks through the application of current to a coil of a voice coil motor (VCM) within the HDA, the coil being mounted to the actuator opposite the heads. The tracks are defined from servo data written to servo fields on the surfaces of the discs during the manufacturing of the HDA. User data are stored in user data fields that are formed between adjacent servo fields. The servo data are periodically transduced and provided to a servo processor which carries out positioning operations (such as seeks and track following modes) in accordance with programming and commands from a top level disc drive processor.

The preamp is used to multiplex the various read and write elements of the various heads onto a single channel to the read/write channel circuitry. To this end, a typical preamp includes a buffer that contains several digital registers that are controlled by the servo processor via a specialized serial link so that command inputs, such as the identification of the selected head, the magnitude of read bias current and the magnitude of write current can be programmably selectable. For example, to effectuate a head switch, the servo processor writes a new head value to the preamp head register to indicate the new location for the head. Since many registers must be updated at every head switch, the minimum head switch time is constrained by the time it takes to complete all the register writes.

MR heads, while providing substantially greater levels of performance over prior generation inductive heads, are also more susceptible to damage due to an overcurrent condition. While nominally identical, process variations will usually result in MR heads having different levels of maximum permissible read bias current magnitude. As it is important to not apply more than the maximum permissible read bias current to a particular head, disc drives typically carry out a head switch operation wherein the preamp switches the interconnection of the read/write channel from a first head to a second head by first switching from the first head to a dummy load, that is, a non-head resistive current path; that is, the read bias current previously passed through the first head is shunted into an internal or an external resistor. This condition is sometimes referred to as "dummy mode." Setting the preamp in dummy mode requires the writing of the appropriate command bit or bits to the associated preamp command register. Once the current is directed to the dummy load, a second preamp write command is executed to switch the read bias current to the new level appropriate for the second head to be selected, after which a third write command is executed to write the address of the second head into the appropriate selected head register. Finally, a fourth write command toggles the command register to remove the preamp from dummy mode, causing the new, second read bias current magnitude to be applied to the second head. Thus, while such an approach minimizes the potential for damage due to overcurrent conditions in the heads, multiple preamp accesses are required, which requires both an undesired amount of time as well as substantial overhead from the servo processor, which is also carrying out other servo positioning operations.

Accordingly, there is a continued need for improvements in the manner in which head switching occurs to improve the operational performance of a disc drive, and it is to such improvements that the present invention is directed.

SUMMARY OF THE INVENTION

The present invention is directed to an apparatus and method for providing improved head switching in a disc drive.

In accordance with preferred embodiments, a disc drive includes a head/disc assembly (HDA) housing a plurality of disc recording surfaces and an actuator assembly which supports a corresponding plurality of heads adjacent the surfaces. A preamplifier circuit is mounted to the actuator assembly and includes a bias current source which generates a first bias current of selected magnitude to apply to a first head.

A sequence control circuit detects the input of a multi-bit head selection value indicative of a second head to a buffer of the preamp of the disc drive. The sequence control circuit simultaneously switches the first bias current from the first head to a dummy load before completion of the input of the head selection value in the buffer. After a second bias current of a second magnitude is written to the buffer, a predetermined time interval elapses so that the second bias current is applied to the dummy load, to prevent application of current transients to the second head. The sequence control then deasserts the dummy load to direct the second bias current to the second head.

These and various other features as well as advantages which characterize the present invention will be apparent from a reading of the following detailed description and a review of the associated drawings.

BRIEF DESCRIPTION OF THE DRAWINGS

FIG. 3 shows a basic construction of one of the MR heads of the HDA.

FIG. 4 provides a representation of registers of the preamplifier/driver circuit shown in FIG. 2.

FIG. 5 provides a representation of a preamplifier/driver circuit used to supply bias currents to a plurality of MR heads, in accordance with preferred embodiments of the present invention.

DETAILED DESCRIPTION

Figure 1:
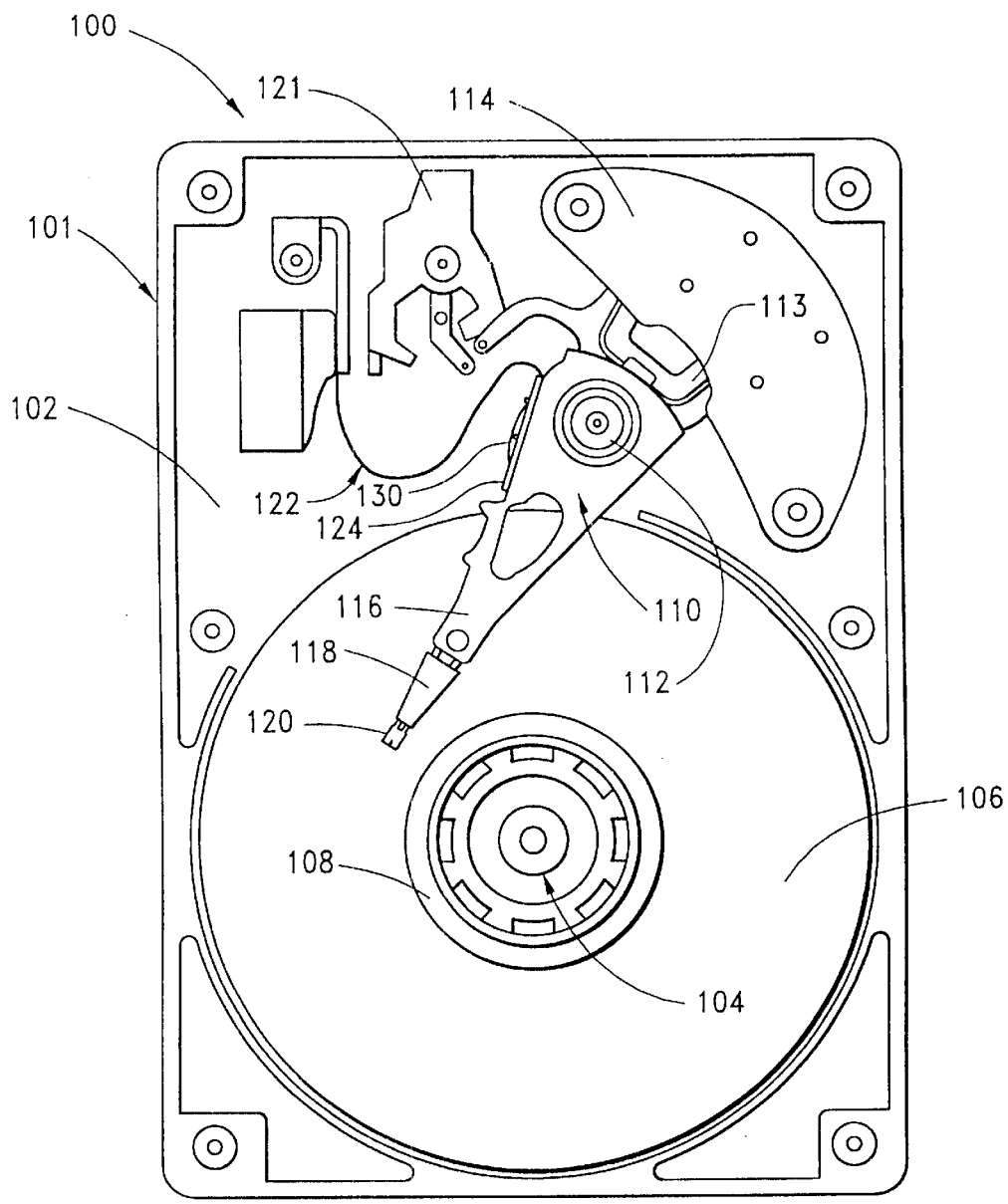
FIG. 1 is a top plan view of a head/disc assembly (HDA) of a disc drive constructed in accordance with preferred embodiments of the present invention, with the HDA combinable with a PWA to complete the disc drive.

Referring first to FIG. 1, shown therein is a top plan view of a disc drive 100, constructed and formatted in accordance with preferred embodiments of the present invention. The disc drive 100 is formed of two primary assemblies: a head/disc assembly (HDA) 101 which composes substantially all of the mechanical portions of the disc drive, and a printed wiring assembly (PWA) which supports electronics used to control the operation of the HDA. The PWA is mounted to the underside of the HDA 101 and is thus not visible in FIG. 1.

The HDA 101 includes a base deck 102 to which various disc drive components are mounted. A top cover, which has been omitted from FIG. 1 to facilitate the present discussion, cooperates with the base deck 101 to form a sealed housing for the HDA 101. A spindle motor 104 is provided to rotate a stack of discs 106 at a constant high speed during normal disc drive operation, with a disc clamp 108 securing the discs to the spindle motor 104.

To access the discs 106, a controllably positionable actuator assembly 1 10 (also referred to as an "E-block") is provided which rotates about a cartridge bearing assembly 112 in response to currents applied to a coil (a portion of which is shown at 113) of a voice coil motor (VCM) 114. The actuator assembly 110 includes a plurality of actuator arms from which corresponding flexure assemblies extend, the topmost of which are identified at 116 and 118 respectively. Heads 120 are provided at distal ends of the flexure assemblies 116, 118 and are supported over the discs 106 by air bearings established by air currents set up by the rotation of the discs 106. The heads 120 are positionably located over data tracks (not shown) of the discs 106 in order to read data from and write data to the tracks, respectively. As discussed more fully below, the heads 120 are characterized as magneto-resistive (MR) heads, with each head including a thin film inductive write element and a MR read element.

A latch assembly 121 secures the heads 120 over texturized landing zones (not shown) at the innermost diameters of the discs 106 when the HDA 101 is not in an operational mode (i.e., when the discs 106 are brought to rest). A flex circuit assembly 122 facilitates electrical communication between the actuator assembly 110 and the PWA. The flex circuit assembly 122 includes a flex circuit board 124 which supports an encapsulated preamplifier/driver circuit 130 which applies read and write currents to the heads 120. Preferred construction and operation of the preamplifier/driver circuit 130, also referred to herein as the "preamplifier circuit" and the "preamp," will be discussed in greater detail below.

Figure 2:
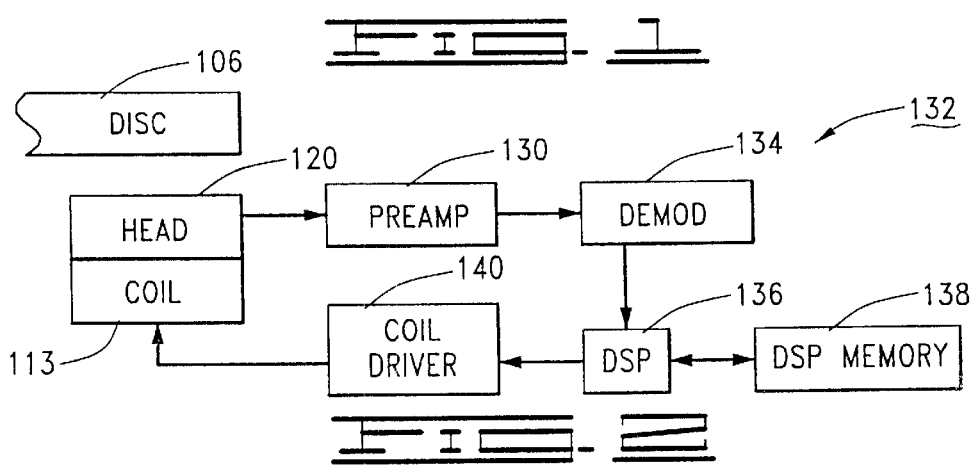
FIG. 2 provides a functional block diagram of a servo control circuit used to effect head positional control by the disc drive, with the circuitry being disposed on the disc drive PWA.

Reference is next made to FIG. 2, which provides a functional block diagram of a servo circuit 132 used to effect head positional control for each of the heads 120 with respect to the corresponding disc surfaces. It will be recognized that most of the servo circuit 132 is disposed on the aforementioned disc drive PWA.

As set forth by FIG. 2, servo data are transduced from a selected disc surface and, after preamplification by the preamp/driver circuit 130 (previously shown in FIG. 1 and herein also referred to as the "preamp"), the servo data are passed to a demodulator circuit (demod) 134 which conditions the servo data for presentation to a digital signal processor (DSP) 136. During servo circuit position control operations, the DSP 136 operates in accordance with programming stored in DSP memory 138 to output current command signals to a coil driver 140, which in turn applies current to the coil 113 to position the head 120 as desired.

Additionally, the DSP 136 communicates with the preamp 130 to select the desired head 120 as well as to select the desired bias current for the head 120. FIG. 3 shows a schematic representation of a selected head 120, generally illustrating the presence of both a write element 142 and a read element 144. As will be understood, the write element 142 is used to write data to the discs 106 and preferably comprises a thin film inductive element with a conductor wrapped multiple times around a horseshoe shaped core with an air gap brought into proximity to the disc surface. As pulsed write currents are passed through the conductor, magnetic fringing occurs across the gap, selectively magnetizing the disc surface.

The read element 144 preferably comprises an MR element formed from an alloy of cobalt, nickel and iron and possesses a nominal direct current (dc) electrical resistance (such as 40 ohms). When the MR element is subjected to a magnetic field of selected orientation, the element undergoes a change in the baseline electrical resistance. Hence, data are read from a disc surface by passing a bias current through the MR element and monitoring changes in voltage thereacross induced by the magnetization of the disc surface. This produces the readback signal which can then be decoded by read/write circuitry to reproduce the originally stored data. The bias current is applied by the preamp 130 and has a magnitude selected by the DSP 136.

It will be recognized that all of the heads 120 have the same nominal construction as shown in FIG. 3, although each of the heads 120 will have different maximum permissible levels of bias current magnitude due to manufacturing process variations. Although MR head technology has been presented herein in accordance with preferred embodiments, it will be further recognized that the present invention, as claimed below, is not necessarily limited to such construction, but can readily be used with other, similar technologies wherein bias currents are applied to read elements to transduce magnetic data, such as giant magnetoresistive (GMR) and spin-valve technologies.

It will be helpful to briefly discuss the manner in which prior art systems, generally similar to the system of FIG. 2 except as discussed below, carry out head switching operations. A preamp is used during read and write operations of a disc drive to access data stored on the corresponding data recording surfaces of the discs. In doing so, the preamp selectively applies currents to the read and write elements of the heads. The preamp preferably incorporates a variety of additional features such as threshold detection, high frequency signal filtering, thermal asperity detection, and head selection capabilities as are generally known in the art. Bias currents applied to the heads through the preamp are controlled in response to bias values that are stored in DSP memory and provided to the preamp.

The head select values and the bias values are expressed in multi-bit, digital form and loaded to selected addresses of an array of corresponding registers (shown generally at 146) of the preamp by way of a serial interface path. FIG. 4 shows three such registers, with a head select register 150 which indicates the selected head, a control register 152 which provides various command inputs to the preamp (including the setting of a dummy mode) and a bias current register 156 which indicates the magnitude of bias current.

Each update of the bias value or the head select value can occur, for example, through the sequential clocking of the bits of a 16 bit word having eight leading address bits (to select one of the registers 150, 152, 154) followed by eight data bits which instruct the preamp to carry out various functions in relation to the value (whether 0 or 1) of the various data bits in each of the registers. The selected register is thus updated with a new word upon receipt of the $16^{th}$ clock pulse.

It is desirable that the magnitudes of the bias currents not exceed the power dissipation capabilities of the individual heads, in order to prevent an inadvertent overbias condition which can adversely affect the long-term operational reliability of the heads. Thus, to effect a head switching operation, a command word is entered to set the appropriate bit or bits of the control register 152 to switch the bias current from the presently selected head (first head) to a dummy load, which is a non-head current path, such as an internal or external resistor. The remaining registers (such as the head select register 150 and the bias current register 156) are then written by the DSP, after which a command word is again provided to the control register 152, this time to manually turn off the dummy mode.

The dummy load effectively diverts the bias current amount for the first selected head from being applied to the second target head while the remaining registers for that second target head are being written, and therefore avoiding overbiasing that second target head. The disadvantages of such a method, however, include the need for numerous preamp accesses (at least a minimum of four) for activating and deactivating the control register to set the dummy load for each head switch operation. Such preamp accesses can therefore significantly increase the amount of time it takes to perform a head switch operation.

Figure 6:
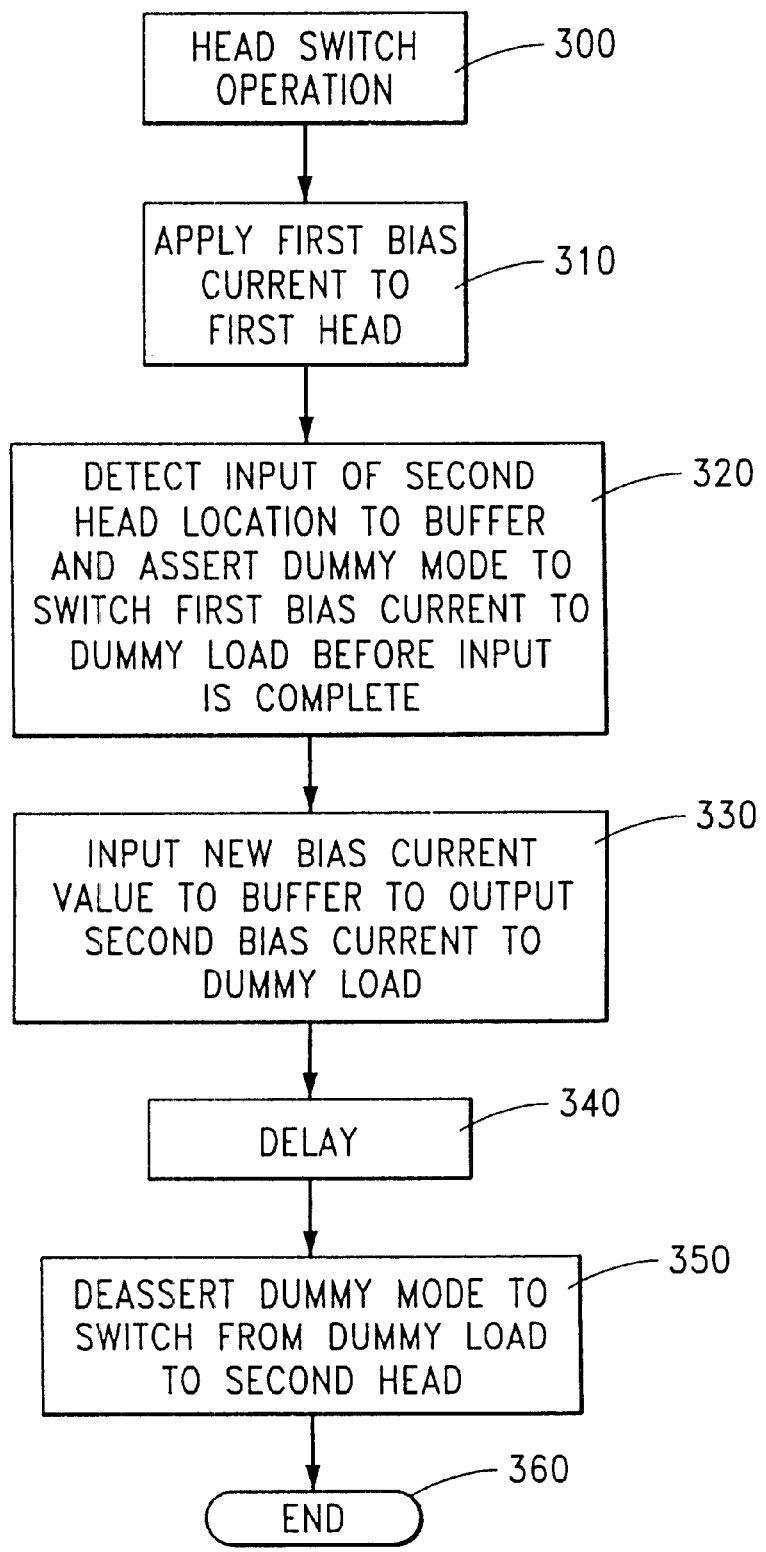
FIG. 6 is a flow chart illustrating a in accordance with preferred embodiments of the present invention.

To overcome prior art deficiencies in providing fast head switching, FIG. 5 is provided to show a generalized functional block diagram of relevant portions of a preamplifier/driver circuit ("preamp") 200 (similar to the preamp 130 of FIGS. 1 and 2), constructed in accordance with preferred embodiments of the present invention. The preamp 200 is operably coupled to a total of four read/write heads 202, 204, 206, 208, which are nominally identical to the heads 120 discussed above. It will be understood that the use of four heads is merely for purposes of illustration, in that preamps such as 200 are commercially available to service a wide variety in the number of heads (such as up to 20 heads). Moreover, it will be understood that the preamp 200 further includes circuitry used to apply write currents to the write elements 192 (FIG. 6) of the heads, but such has been omitted for clarity.

The functional blocks of the preamp 200 set forth in FIG. 5 include a buffer 210, a bias current source 212, a head selection circuit 214, switching circuitry represented as a multiplexer (mux) 216, a read amplifier (amp) 218, and a sequence control circuit 220. To facilitate discussion of the operation of the preamp 200 in FIG. 5, reference will now be made to FIG. 6, which shows a generalized flow chart illustrating a HEAD SWITCH OPERATION 300, in accordance with a preferred embodiment of the present invention. The routine is representative of programming stored in the DSP memory 138 of FIG. 2 and utilized by the DSP 136 at such times that the heads are to be switched.

For clarity, operation during a normal read operation will be discussed but it should be understood that the present invention is equally applicable during a write operation. During operation, a multi-bit input word is supplied to registers 146 (FIG. 4) of a buffer 210 which indicates, among other things, a desired head to be selected (also referred to as a first head). This input word is inputted along path 222. The multi-bit input word also supplies the bias current register 152 of the buffer 210, a desired magnitude of bias current to be applied to the first head 120. In response to the input word, the bias current source 212 selects and outputs the appropriate read bias current along path 222 to the mux 216, as shown in block 310.

Upon detection of the input of a value for a second head to be selected, the sequence control 220 diverts the path 226 of the head selection circuit 214 to engage a dummy load 154 before the input is complete, as shown in block 320, with the dummy load preferably comprising an external resistor operably coupled to the preamp 200. The head selection circuit 214 is effectively deterred from sending the first bias current to the second head upon completion of the input of the value for the location of the second head. In a preferred embodiment, as shown in FIG. 5, the sequence control 220 is operably connected directly to the input path 222 from the DSP to the buffer to detect the bit values as they enter the buffer. The sequence control 220 is also coupled to the head selection circuit to bypass the values indicating the head which should be accessed so that the head selection circuit 214 is directed to engage the dummy load 154. It should be understood that the sequence control 220 may also be operably coupled to the buffer 210 to automatically change the value of the bit indicating the status of the dummy load 154 so that the dummy load 154 is accessed once the input of a head selection value is detected. Alternatively, the sequence control 220 may operably override the value at path 226 to select the dummy load 154 once the head selection value is written into the register 150.

After the preferred amount of registers 146 are written in the buffer 210, a second bias current of a second magnitude is then written to the bias current register 156 in the buffer 210, which is outputted to the dummy load 154 to which the path is still directed, as shown in block 330. An optional delay of predetermined length is provided to allow the second bias current to stabilize without residual current left from the first bias current, block 340. The sequence control 220 then disengages the head selection circuit 214 to switch the path from the dummy load 154 to the second head 120, block 350, at which time the routine ends at block 360. Therefore, the preamp 200 is only accessed to write the registers 146 during normal operation. Moreover, since each of the registers 146 may only be written one at a time, the preamp 200 operation need not be interrupted to manually activate and deactivate the dummy mode. The dummy mode is activated during head switch automatically to reduce the time needed to effectuate a head switch.

It will now be recognized that the present invention is directed to an apparatus and method for improving head switching operations. The disc drive 100 includes a head/disc assembly (HDA) 101 housing a plurality of disc recording surfaces and an actuator assembly 110 which supports a corresponding plurality of heads 120 adjacent the surfaces. A preamplifier circuit 200 is mounted to the actuator assembly 110 and includes a bias current source 212 which generates a first bias current of selected magnitude to apply to a first head 202. A sequence control 220 then detects the input of a multi-bit head selection value indicative of a second head 204 to a buffer 210 of the preamp 200 of the disc drive 100. The sequence control 220 then simultaneously switches the first bias current from the first head 202 to a dummy load 154 before completion of the input of the head selection value in the buffer 210. After a second bias current of a second magnitude is written to the buffer 210, a predetermined time interval elapses so that the second bias current is applied to the dummy load 154. The sequence control 220 then deasserts the dummy load 154 to direct the second bias current to the second head 204.

For purposes of the appended claims, the function of switching between the first and second heads will be understood as being carried out by the structure of FIG. 5 including buffer 210, bias current source 212, head selection circuit 214, MUX 216, sequence control circuit 220 and dummy load 154. Prior art circuits that fail to switch from a first head to a dummy load (such as 154) and then to a second head by applying a first bias current of first magnitude to the first head; detecting input of a multibit head selection value indicative of the second head to a buffer of a preamp of the disc drive and simultaneously switching the first bias current from the first head to a dummy load before completion of the input of the head selection value in the buffer; switching from the first bias current of first magnitude to a second bias current of a second magnitude so that the second bias current is applied to the dummy load; and switching from the dummy load to the second head so that the second bias current of a second magnitude is applied to the second head are explicitly excluded from the definition of an equivalent.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for switching from a first head to a second head in a disc drive, comprising steps of:

(a) applying a first bias current of first magnitude to the first head;

(b) detecting input of a multi-bit head selection value indicative of the second head to a buffer of a preamp of the disc drive and simultaneously switching the first bias current from the first head to a dummy load before completion of the input of the head selection value in the buffer;

(c) switching from the first bias current of first magnitude to a second bias current of a second magnitude so that the second bias current is applied to the dummy load; and (d) switching from the dummy load to the second head so that the second bias current of the second magnitude is applied to the second head.

2. The method of claim 1, wherein the first and second bias currents comprise read bias currents applied to magneto-resistive read elements of the first and second heads, respectively.

3. The method of claim 1, wherein the switching step (c) comprises steps of:

(c1) inputting a multi-bit bias value indicative of the second bias current is input into the buffer;

(c2) applying the second bias current to the dummy load; and (c3) waiting a predetermined time interval.

4. A preamplifier circuit for applying a bias current to a plurality of heads of a head/disc assembly of a disc drive, comprising:

a head selection circuit;

a bias current source which generates the bias current;

an array of programmable registers, operably coupled to the head selection circuit and the bias current source, wherein a digital value stored in one of the registers causes the head selection circuit to select one of the plurality of heads and causes the bias current source to generate a bias current of selected magnitude in relation to the digital value; and a sequence control circuit which detects inputting of a particular digital value to switch from a first head to a second head and which diverts the bias current generated by the bias current source from the first head to a dummy load before completion of the inputting of the particular digital value to the respective register, the sequence control circuit subsequently connecting the bias current source to a second head upon completion of inputting another particular digital value indicative of desired magnitude of bias current to be applied to the second head.

5. The preamplifier circuit of claim 4, wherein the first and second bias currents comprise read bias currents applied to magneto-resistive read elements of the first and second heads, respectively.

6. The preamplifier circuit of claim 4, wherein the sequence control circuit executes a delay of predetermined length after the conclusion of the inputting of the digital value indicative of the magnitude of the second bias current before switching from the dummy load to the second head.

7. A head/disc assembly of a disc drive, comprising: first and second heads supported adjacent corresponding first and second disc recording surfaces; and means for switching between the first and second heads.

* * * * *